US006557586B1

(12) United States Patent
Lockyer et al.

(10) Patent No.: US 6,557,586 B1
(45) Date of Patent: May 6, 2003

(54) CONTROL HANDLE SUPPORT AND VALVE LINKAGE ASSEMBLY

(75) Inventors: Wayne David Lockyer, Winchester (GB); Eugene G. Bruns, Maria-Stein, OH (US); Nita Louise Watercutter, Sidney, OH (US)

(73) Assignee: Crown Equipment Corporation, New Bremen, OH (US)

( * ) Notice: Subject to any disclaimer, the term of this patent is extended or adjusted under 35 U.S.C. 154(b) by 0 days.

(21) Appl. No.: 09/645,412

(22) Filed: Aug. 25, 2000

Related U.S. Application Data

(60) Provisional application No. 60/151,118, filed on Aug. 27, 1999.

(51) Int. Cl.[7] ......................... F16K 31/60; F16K 11/22; F17D 3/01

(52) U.S. Cl. ........................... 137/637; 74/491; 74/523; 137/899; 251/279

(58) Field of Search ................................ 137/637, 899; 74/469, 471 R, 471 XY, 491, 523; 251/251, 279

(56) References Cited

U.S. PATENT DOCUMENTS

| | | | | |
|---|---|---|---|---|
| 2,861,593 A | * 11/1958 | Bowman | | 137/637 |
| 3,492,889 A | * 2/1970 | Hauff | | 137/637 |
| 4,051,860 A | * 10/1977 | Dowd et al. | | 137/637 |
| 4,054,083 A | * 10/1977 | Utter | | 91/523 |
| 4,074,690 A | * 2/1978 | Adams et al. | | 74/491 |
| 4,140,144 A | * 2/1979 | Dowd et al. | | 137/271 |
| 4,310,026 A | * 1/1982 | Oliver et al. | | 74/491 |
| 4,526,204 A | * 7/1985 | Primdahl | | 137/637 |
| 4,660,730 A | * 4/1987 | Holmes | | 137/637 |
| 5,138,756 A | * 8/1992 | Johnson et al. | | 137/637 |

FOREIGN PATENT DOCUMENTS

| | | | |
|---|---|---|---|
| GB | 90/13863 | * 11/1990 | 137/637 |

OTHER PUBLICATIONS

Page 7 of a Yale Brochure published in Apr., 1994.
4 pages illustrating and listing parts for a European Crown lift truck, published mid–1995.

* cited by examiner

*Primary Examiner*—George L. Walton
(74) *Attorney, Agent, or Firm*—Stevens & Showalter LLP

(57) ABSTRACT

A control handle support and valve linkage assembly for use in a lift truck or like vehicle is provided. The assembly includes a first stationary bracket and a second bracket that pivots relative to the first bracket. At least one, and preferably an array of control handles are coupled to the second bracket. A seat deck on the lift truck includes an actuator for engaging a member projecting from the second bracket. When the seat deck is in the closed position, the second bracket is kept in a first, retracted position, and hence, the control handle(s) are kept close to and within the comfortable reach of an operator seated in the adjacent seat. Then, when the seat deck is opened, such as when the operator desires to access a battery compartment or the like, the second bracket, and hence, the control handle(s) automatically and simultaneously pivot or rotate relative to the first stationary bracket. This moves the control handles out of the path of travel of the seat deck to avoid creating any interference. A linkage is also provided for linking each control handle to a valve and a corresponding switch. Together, the valve and switch regulate fluid flow to control one or more aspects of the operation of a carrying assembly or like structure associated with the lift truck.

23 Claims, 8 Drawing Sheets

CONTROL HANDLE SUPPORT AND VALVE LINKAGE ASSEMBLY

This application claims the benefit of U.S. Provisional Patent Application Ser. No. 60/151,118, filed Aug. 27, 1999, entitled "Control valve linkage assembly," which is incorporated herein by reference.

TECHNICAL FIELD

The present invention relates generally to vehicle control and, more particularly, to an improved assembly for both supporting one or more control handles in a lift truck such that interference with a movable deck or like structure is avoided and linking the control handles to valves for controlling the operation of a carrying assembly forming a part of the lift truck.

BACKGROUND OF THE INVENTION

In a conventional lift truck, an array of control handles are provided for controlling the flow of hydraulic fluid typically used to raise, rotate, or otherwise move a portion of the carrying or lifting apparatus (i.e., the mast and forks and accompanying structures). These control handles should be conveniently located within the operator compartment for easy, comfortable access. Of course, providing control handles that are securely and reliably linked to the corresponding valve(s) for controlling the flow of hydraulic fluid is also an important consideration, as is minimizing the number of parts required and reducing the overall complexity.

Typically, a lift truck is provided with a compartment covered by a movable deck that carries an operator's seat. This compartment usually contains components responsible for providing power to the lift truck, including the battery. In such an arrangement, positioning the control handles comfortably within the reach of the operator generally places them immediately over the seat deck or other movable structure forming a part of the lift truck base. As a result of this placement, the control handles create an obstacle to removing the deck for gaining access to the adjacent battery compartment or the like.

In one prior art truck, before the seat deck can be opened to gain access into the battery compartment, a control handle release mechanism must be actuated followed by the manual pivoting of the control handles away from the seat deck. Such an arrangement is disadvantageous as additional time and effort are required to reposition the control handles prior to opening the seat deck. Further, it requires that an operator be positioned on a side of the truck to which the control handles are located when opening the seat deck. Typically, this side of the truck is opposite to the side that is used when exiting or entering the operator's compartment, resulting in the operator walking around the truck before and/or after opening the seat deck.

In another prior art truck, the control handles, structure which couples the handles to corresponding valves and a front cover, automatically pivot away from the seat deck when the deck is opened. A costly pivoting plate must be provided for mounting the handles, the coupling structure and the front cover. It is also noted that the plate has a low pivot position. Consequently, substantial clearance is required between the floorplate and the front cover, to allow the plate, the control handles, the coupling structure and the front cover to rotate away from the seat deck when the seat deck is raised. This clearance allows the ingress of foreign material onto the hydraulic valves, which is undesirable.

Further, the shape of the front cover restricts easy ingress into and egress from the operator's compartment.

Thus, a need is identified for an improved manner for supporting one or more control handles within the comfortable reach of the operator, while at the same time avoiding the creation of interference with removable structures on the lift truck, such as the deck carrying the operator's seat.

SUMMARY OF THE INVENTION

In accordance with a first aspect of the invention, a control handle support and valve linkage apparatus for mounting adjacent a movable deck on a lift truck is provided. The apparatus includes a first stationary bracket and a second bracket in engagement with the first bracket. At least one control handle assembly is coupled to the second bracket, and preferably positioned for easy access by the lift truck operator when seated in the operator's compartment. The second bracket is movable relative to the first bracket between a first retracted position and a second non-interfering position, with the second bracket being in the first position when the deck is in a closed position and in the second position when the deck is moved to an open position. Accordingly, when the seat deck is opened, the second bracket simultaneously pivots to move the control handle assemblies out of the way. This simultaneous pivoting action avoids creating any interference between the control handle assemblies and the seat deck as it is lifted. Further, the pivoting action avoids any interference between the handle assemblies and the battery when the battery is lifted for removal.

In one embodiment, the control handle support and valve linkage apparatus includes a spring for biasing the second bracket relative to the first bracket. The biasing force supplied by this spring allows the second bracket to pivot from the first to the second position when the deck is opened. Preferably, the second bracket rotates through an angle from about 15 degrees to about 90 degrees in moving from the first position to the second position, and most preferably through an angle of about 22°. To provide the desired simultaneous pivoting action and relative movement, the second bracket further comprises a projecting member and the deck includes an actuator. When the deck is moving from the open to the closed position, this actuator engages the projecting member to overcome the spring biasing force and pivot the second bracket to the first position. In a most preferred embodiment, the projecting member is a substantially cylindrical rod and the actuator includes a C-shaped recess for engaging the rod. The deck preferably is at least a portion of a seat deck forming a part of a base portion of the lift truck.

In accordance with a second aspect of the present invention, a control handle support and valve linkage assembly is provided for mounting adjacent to a movable deck on a lift truck having a carrying assembly. The control handle support and valve linkage assembly comprises a first stationary bracket, at least one valve for controlling fluid flow to and away from the carrying assembly on the lift truck, a second bracket engaging the first bracket, at least one control handle assembly coupled to the second bracket, structure for coupling the at least one control handle assembly to the at least one valve, and at least one switch coupled directly to the at least one valve and operable to control fluid flow to the at least one valve. The second bracket is movable relative to the first bracket between a first position when the deck is closed and a second position when the deck is open. Preferably, the coupling structure does not pivot or otherwise move when the second bracket moves between its first and second positions.

Preferably, the control handle support and valve linkage assembly further includes a stationary cover. In one preferred embodiment, the cover has a generally planar outer surface. Advantageously, this planar outer surface does not interfere with the ingress to and egress from the operator's compartment of the lift truck.

In one embodiment, the second bracket rotates relative to the first bracket through an angle of from about 15 degrees to about 90 degrees in moving from the first position to the second position. The second bracket may also rotate through other angular ranges including all ranges subsumed within the range of from about 15 degrees to about 90 degrees. Also, the coupling structure comprises at least one link and at least one cam. The at least one link is coupled to the at least one control handle assembly and the at least one cam. The at least one cam is further coupled to the at least one valve, which preferably comprises a spool valve.

Most preferably, first and second control handle assemblies are provided as part of the control valve linkage assembly. A spring is also provided for biasing the second bracket relative to the first bracket such that the second bracket pivots from the first position to the second position when the deck is moved to the open position. The second bracket includes a projecting member and the deck further comprises an actuator for engaging the projecting member to pivot the second bracket to the first position when the deck is moved to a closed position. In one particular embodiment, the projecting member is a substantially cylindrical rod and the actuator includes a C-shaped recess for engaging the rod. The deck is a seat deck forming a part of a base portion of the lift truck.

DETAILED DESCRIPTION OF THE INVENTION

Figure 1:
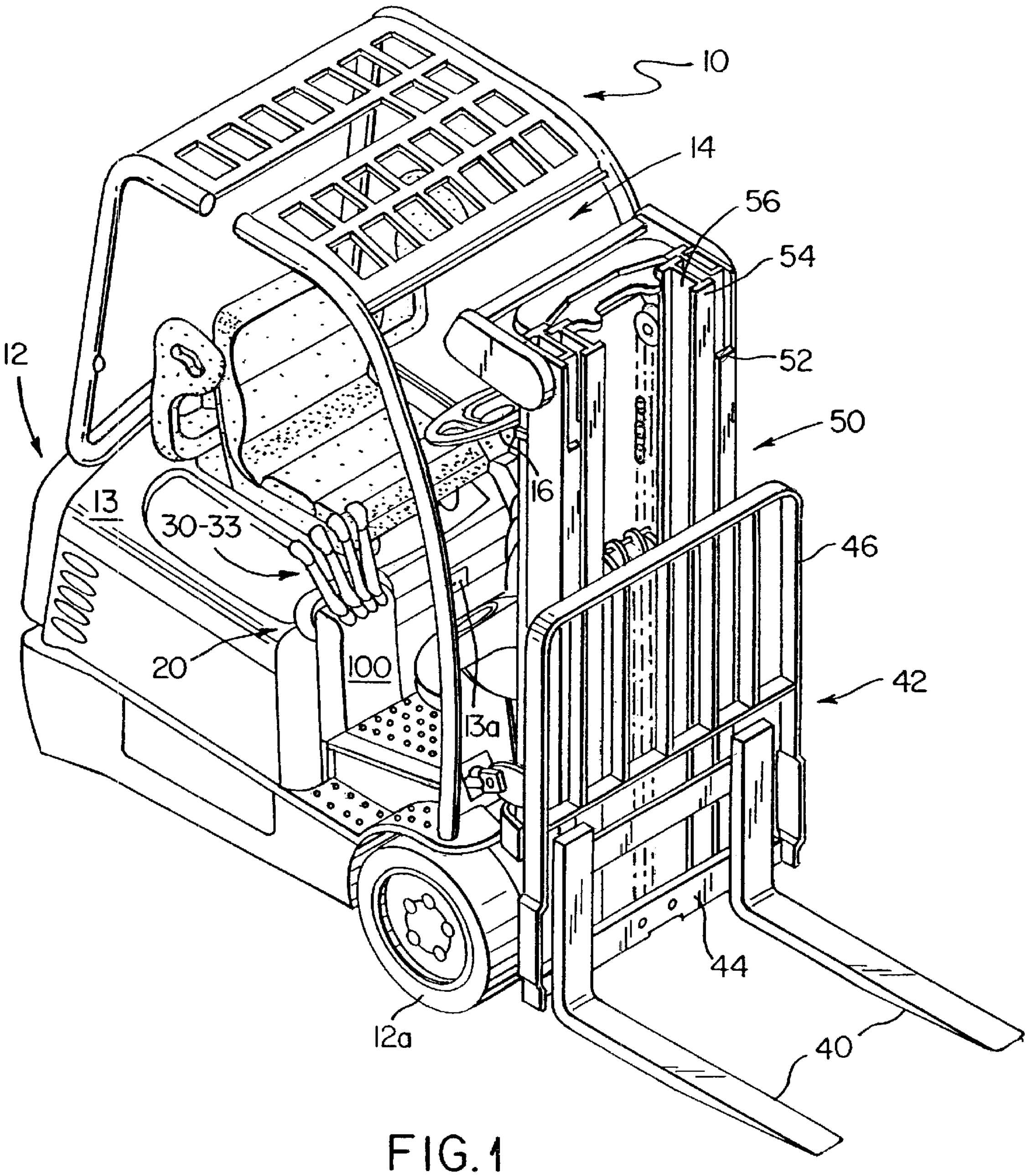
FIG. 1 is an overall perspective view of a lift truck.
Figure 2:
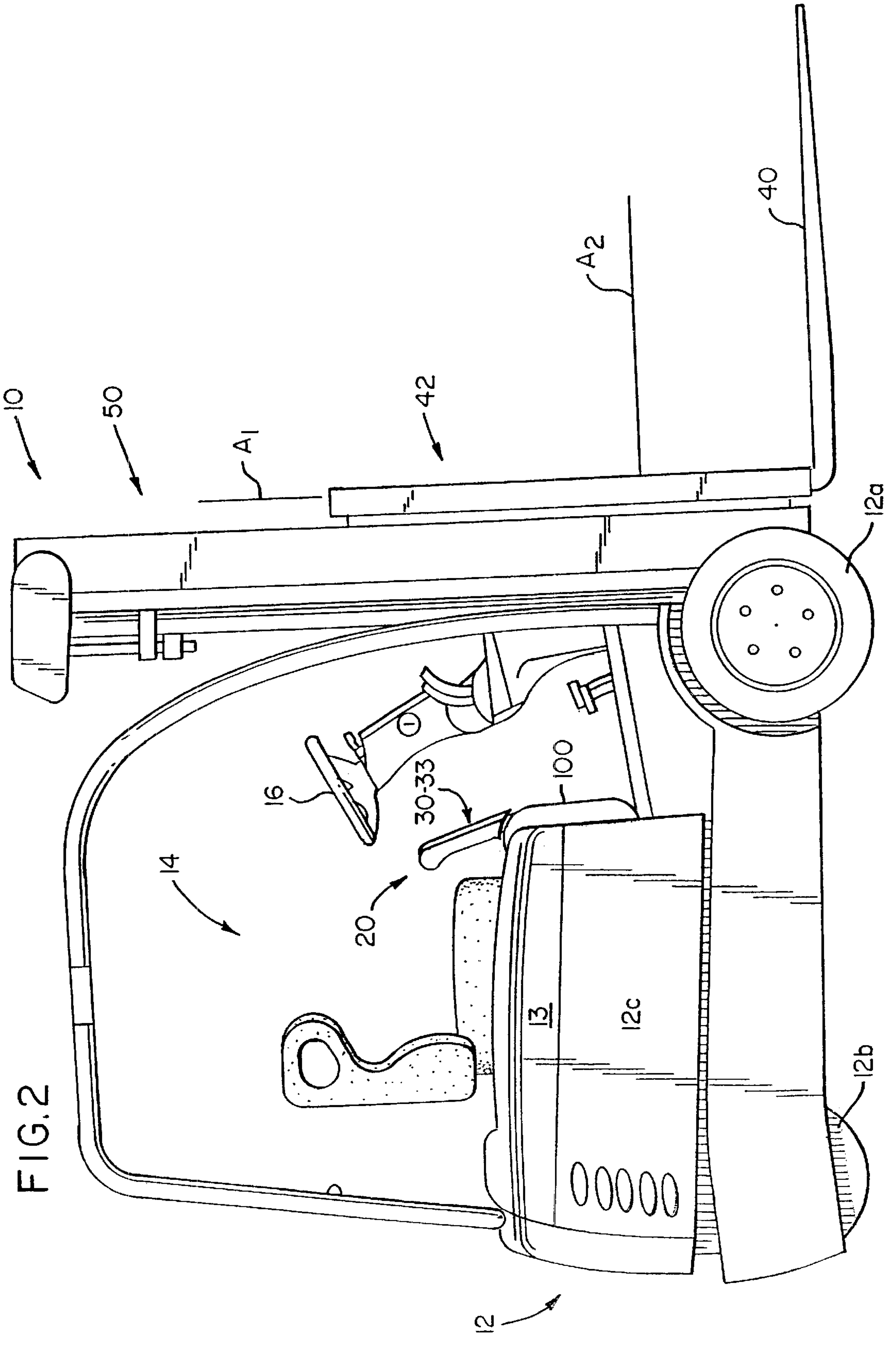
FIG. 2 is a side elevational view of the lift truck of FIG. 1.

Reference is now made to FIGS. 1 and 2, which illustrate a fork lift truck 10 including a control handle support and valve linkage assembly 20 constructed in accordance with the present invention. The truck 10 includes a body 12 housing a battery 140 (see phantom view in FIGS. 5*a* and 5*b*) for supplying power to a traction motor (not shown) connected to a pair of front drive wheels 12*a* (only one shown in FIGS. 1 and 2) and to one or more hydraulic motors (not shown) supplying hydraulic fluid to several different systems, such as mast and fork hydraulic cylinders. The traction motor and the drive wheels 12*a* define a drive mechanism for effecting movement of the truck 10. An operator's compartment 14 in the body 12 is provided with a steering wheel 16 for controlling the direction of travel of the truck 10 and control handles 30–33 (see FIG. 3*a*) are provided for controlling fork height, tilt, side shift and fork rotation. The steering wheel 16 is coupled via conventional apparatus to a pair of steerable rear wheels 12*b* (only one shown in FIG. 2).

As best shown in FIG. 1, a pair of forks 40 are mounted on a fork carriage mechanism 42 that includes a fork carriage 44 and a load back rest 46. The forks 40 are coupled to the fork carriage 44 which, in turn, is coupled to an extensible mast assembly 50. The load back rest 46 is coupled to the fork carriage 44. The mast assembly 50 includes a fixed lower mast member 52 and nested first and second movable mast members 54 and 56. The lower mast member 52 is fixedly coupled to the body 12, while the second movable mast member 56 is coupled directly to the fork carriage 44. The fork carriage mechanism 42 and the mast assembly 50 together define a fork carrying assembly. The mast assembly 50 includes a plurality of hydraulic cylinders (not shown) for effecting vertical movement of the mast members 54 and 56. Further, hydraulic cylinders (not shown) are coupled to the body 12 and the mast assembly 50 for tilting mast members 52, 54 and 56 toward and away from the truck 10 about a substantially horizontal axis. Additional hydraulic apparatus (not shown) is provided between the mast assembly 50 and the carriage mechanism 42 for moving the carriage mechanism 42 and the forks 40 from side to side about a vertical axis $A_1$, as well as rotating the carriage mechanism 42 and the forks 40 about an axis of rotation $A_2$ (see FIG. 2).

Figure 3A:
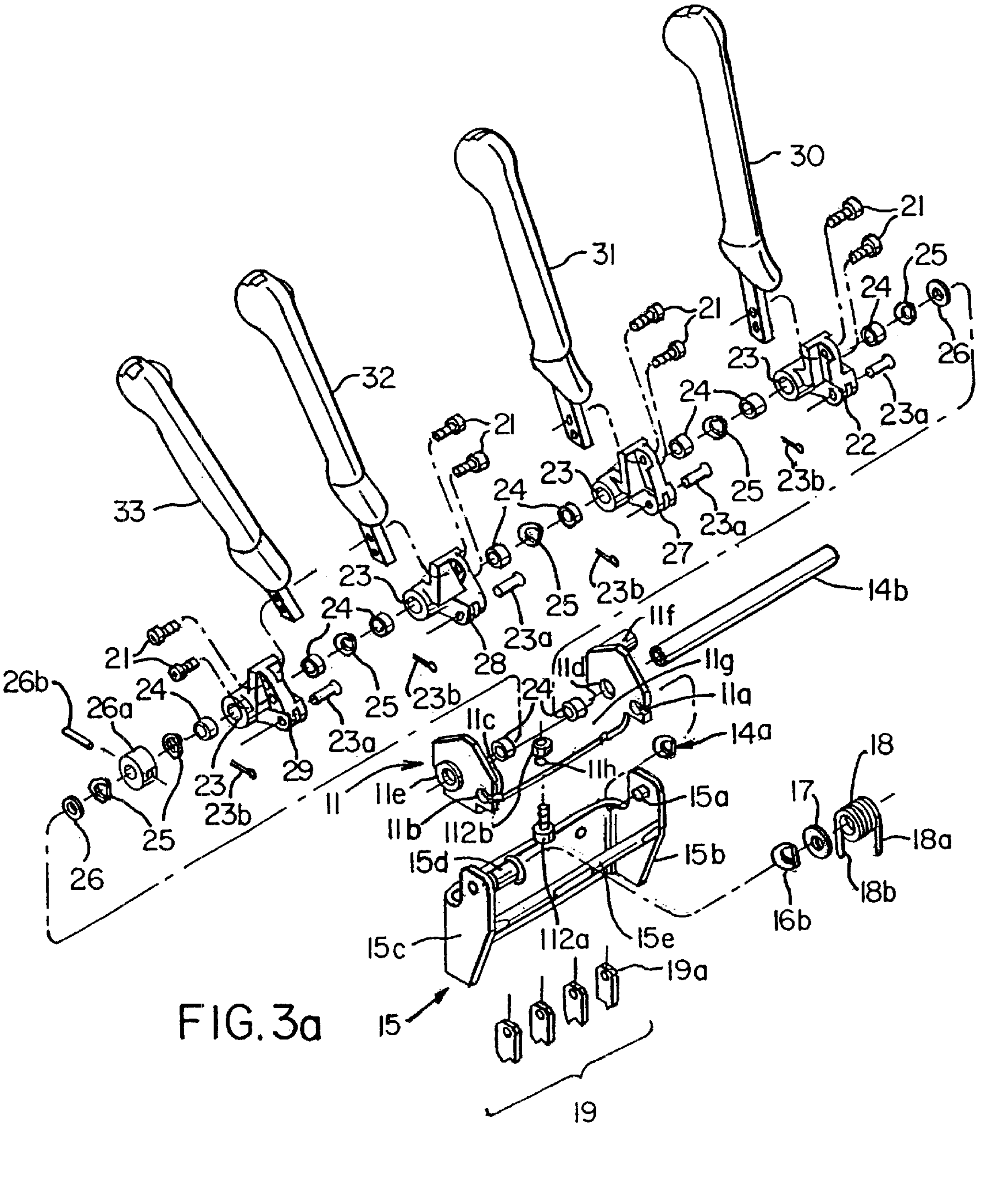
FIG. 3*a* is the upper portion of an exploded view showing the control handle support and valve linkage assembly of the present invention.

Referring now to FIG. 3*a,* the control handle support and valve linkage assembly 20 includes the control handles 30–33. The assembly 20 also includes a first generally horizontal stationary bracket 15 and a second, rotatable bracket 11 coupled to the first bracket 15. The first bracket 15 is fixedly mounted to the body 12 of the lift truck 10 below a seat deck 13 (see FIG. 4) and includes a two opposed, inwardly projecting coaxial cantilevered pins 15*a* and 15*d* (see FIG. 3*c*) extending inwardly from first and second sidewalls 15*b* and 15*c* of the first bracket 15. The second rotatable bracket 11 includes first and second recesses 11*a* and 11*b* for receiving each of the respective opposing pins 15*a* and 15*d* on the first bracket 15. Pin 15*d* has a first portion having a first diameter and a second portion having a second diameter which is greater than the first diameter. The second recess 11*b* receives the first portion of the pin 15*d.* When assembled, the second bracket 11 is thus rotatably mounted to the first bracket 15 by virtue of this connection. A spring washer 14*a* is also fitted over pin 15*a* and a spring washer 16*b* is fitted over pin 15*d* to frictionally engage the corresponding sidewalls 15*b,* 15*c* of the bracket 15.

The pin 15*d* further receives a flat washer 17 and a torsion spring 18. The spring 18 is received on the second portion of the pin 15*d.* The pin 15*d* serves as a hub for the spring 18 that causes the second bracket 11 to pivot relative to the first bracket 15. More specifically, in the preferred embodiment, a first leg 18*a* of the spring 18 projects downwardly and is received in a recess 150 formed in a cross bar 15*e* of the bracket 15, while a second leg 18*b* of the spring 18 also projects downwardly and is captured in a C-shaped recess 11*c* provided in the second bracket 11. As outlined further in the description that follows, the spring 18 effects pivotable movement of the second bracket 11 relative to the first bracket 15 when the seat deck 13 is opened, thereby serving to simultaneously and automatically move the control handles 30–33 out of the way to avoid creating interference.

The first control handle 30 is mounted to a first bellcrank 22 via at least one, and preferably a pair of screws 21. The first handle 30 and the first bellcrank 22 comprise a first handle assembly. The second, third and fourth control handles 31–33 are similarly coupled to second, third and fourth bellcranks 27–29 via pairs of screws 21. The control handles 31–33 and the bellcranks 27–29 comprise second, third and fourth handle assemblies. The term "handle assembly," as used herein, is also intended to cover a handle when used without accompanying structure such as a bellcrank, or an integral handle/bellcrank unit.

Each bellcrank 22 and 27–29 is provided with a bore 23. Two bushings 24 are press-fit into opposing ends of each bore 23. A shaft 14*b* passes through each set of two bushings 24 and, hence, through the bores 23 in the bellcranks 22 and 27–29. The shaft 14*b* also passes through bushings 24 press-fit into bores 11*d* and 11*e* in the second bracket 11. The bellcranks 22 and 27–29 and the bushings 24 are rotatable about the shaft 14*b,* and the shaft 14*b* is rotatable relative to the bracket 11. Spring washers 25 and flatwashers 26 are captured in place by a collar-like spacer 26*a* connected to the shaft 14*b* using a transverse pin 26*b.* The pin 26*b* extends through openings in the spacer 26*a* and shaft 14*b* (the opening in the shaft is not shown).

Figure 3B:
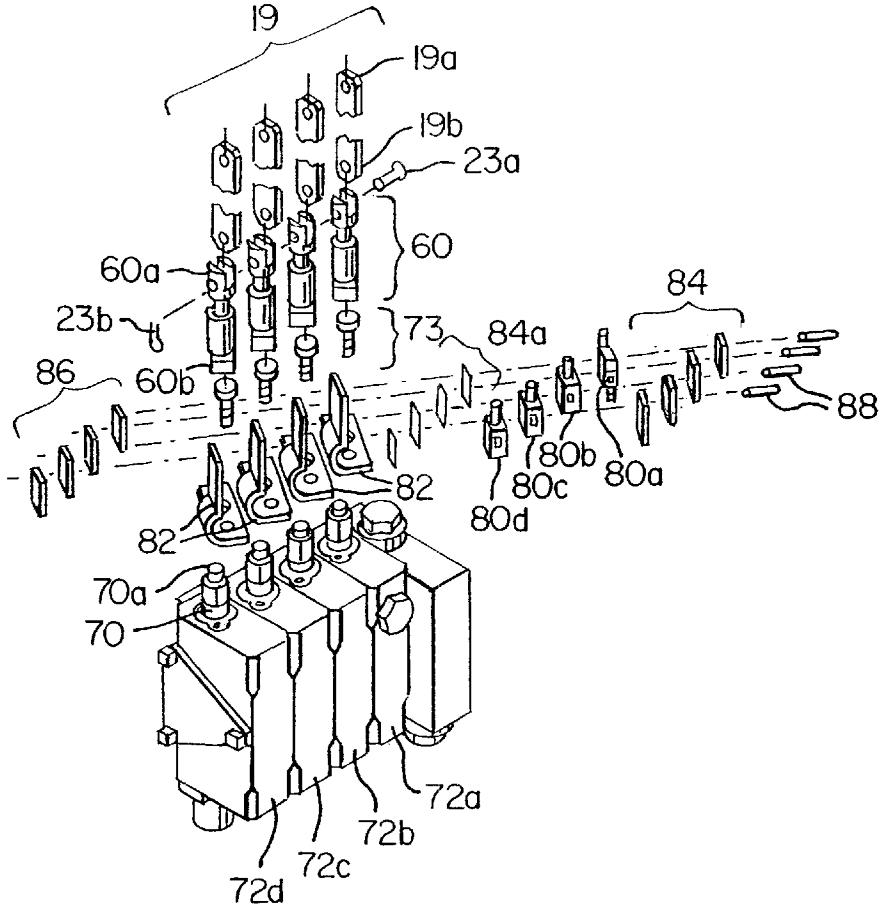
FIG. 3*b* is the lower portion of an exploded view showing the control handle support and valve linkage assembly of the present invention.
Figure 3C:
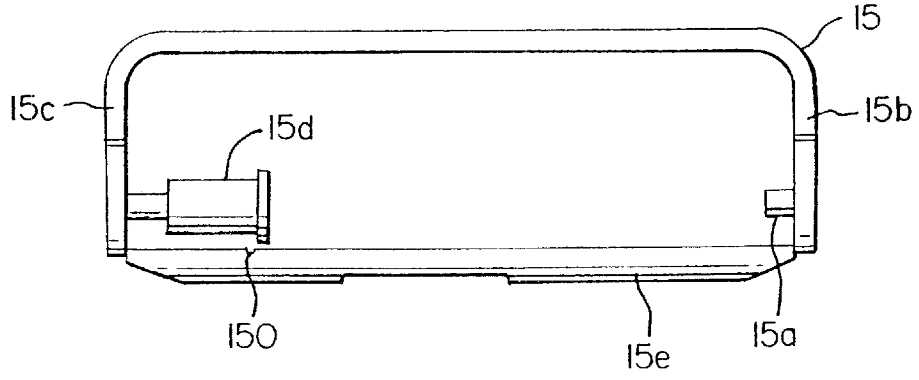
FIG. 3*c* is a plan view of the first stationary bracket illustrated in FIG. 3*a;*

The first ends 19*a* of first, second, third and fourth links 19 are coupled to the first, second, third and fourth bellcranks 22 and 27–29 via retainer pins 23*a* and captivated by cotter pins 23*b,* see FIG. 3*a*. The opposite, or second ends 19*b* of the first, second, third and fourth links 19 are separately coupled to first ends 60*a* of cams 60, see FIG. 3*b*. A separate retainer pin 23*a* and cotter pin 23*b* (only one of each is shown in FIG. 3*b*) is provided for coupling each link second end 19*b* to its corresponding cam 60. The second end 60*b* of each cam 60 includes a threaded recess (not numbered) for receiving a threaded upper portion 70*a* of a spool 70 of a corresponding first, second, third or fourth spool valve 72*a*–72*d.* Hence, pivotal movement of the control handles 30–33 and coupled bellcranks 22 and 27–29 about shaft 14*b* moves the links 19, cams 60 and spools 70 generally in a vertical direction.

First, second, third and fourth switches 80*a*–80*d* are directly coupled to each of the respective spool valves 72*a*–72*d.* These switches 80*a*–80*d* are preferably conventional snap-action switches. The switches 80*a*–80*d* are coupled to the spool valves 72*a*–72*d* by brackets 82, spacer plates 84, insulators 84*a,* retainer plates 86, and bolts 88. The retainer plates 86 are provided with tapped holes (not shown) for threadedly receiving the bolts 88. For each switch 80*a*–80*d,* a spacer plate 84 and an insulator 84*a* are positioned on opposing sides of the switch. Further, one or more bolts pass through openings provided in the spacer plate 84, openings in the insulator 84*a,* openings in the switch and openings in the bracket 82 and threadedly engage openings in the retainer plate 86, which is positioned on a side of the bracket opposite to the side to which the spacer plate, insulator and switch are positioned, for securing the switch to its bracket 82. The brackets 82 are coupled to the valves 72*a*–72*d* via bolts 73.

Figure 4:
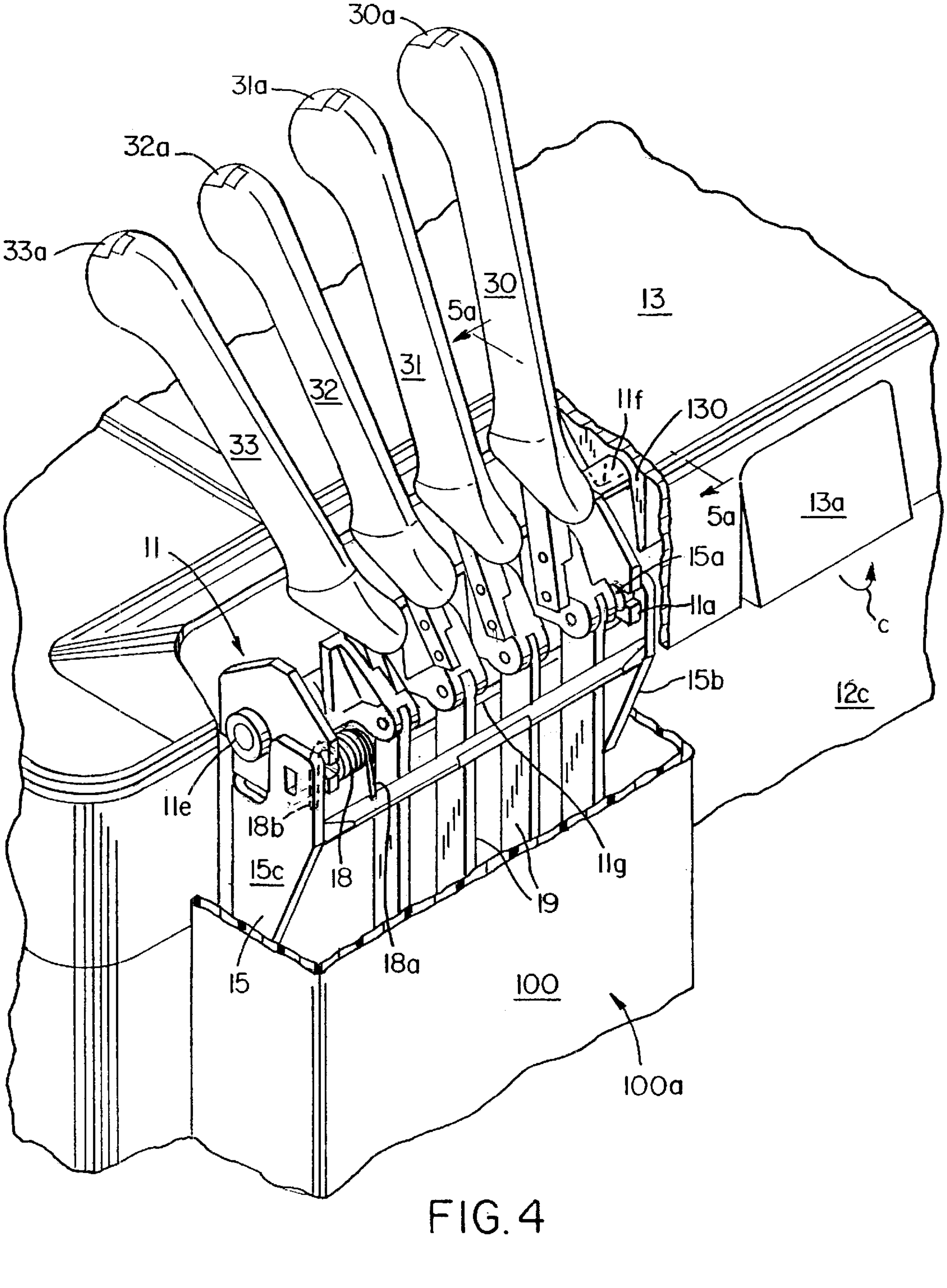
FIG. 4 is an enlarged, partially cutaway view of the upper portion of the control handle support and valve linkage assembly of the present invention, with a portion of the cover cutaway to show the connection between the bellcrank secured to each control handle and the corresponding coupling structure.

Referring now to FIGS. 1 and 4, a conventional latch 13*a,* coupled to the seat deck 13, is provided for releasably locking the seat deck 13 to a base portion 12*c* of the body 12 of the lift truck. The seat deck 13 is provided with an actuator, which in the preferred embodiment is a hook 130 having a C-shaped recess (see FIGS. 5*a* and 5*b*). The hook 130 is fixedly connected to the seat deck 13 such that it does not move relative to the seat deck 13 and is spaced horizontally from the latch 13*a,* see FIG. 4.

Figure 5B:
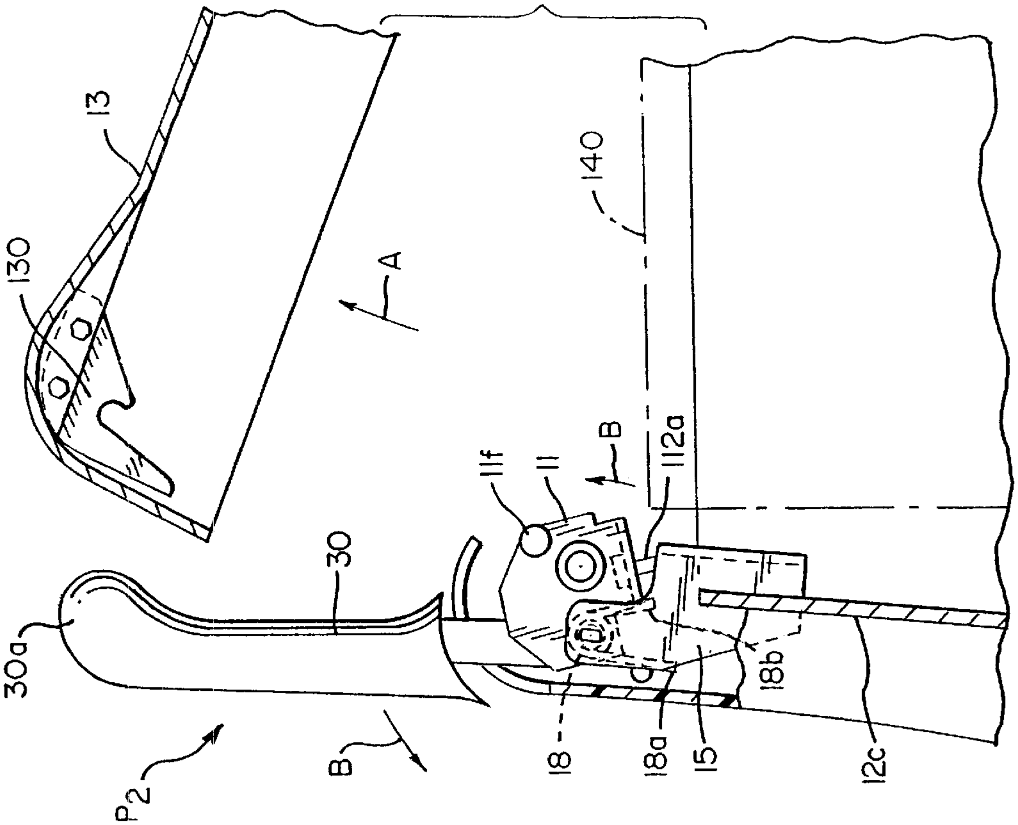
FIG. 5*b* is similar to FIG. 5*a,* but shows the bracket pivoted to a second position upon the lifting of the seat deck forming a part of the lift truck base.
Figure 5A:
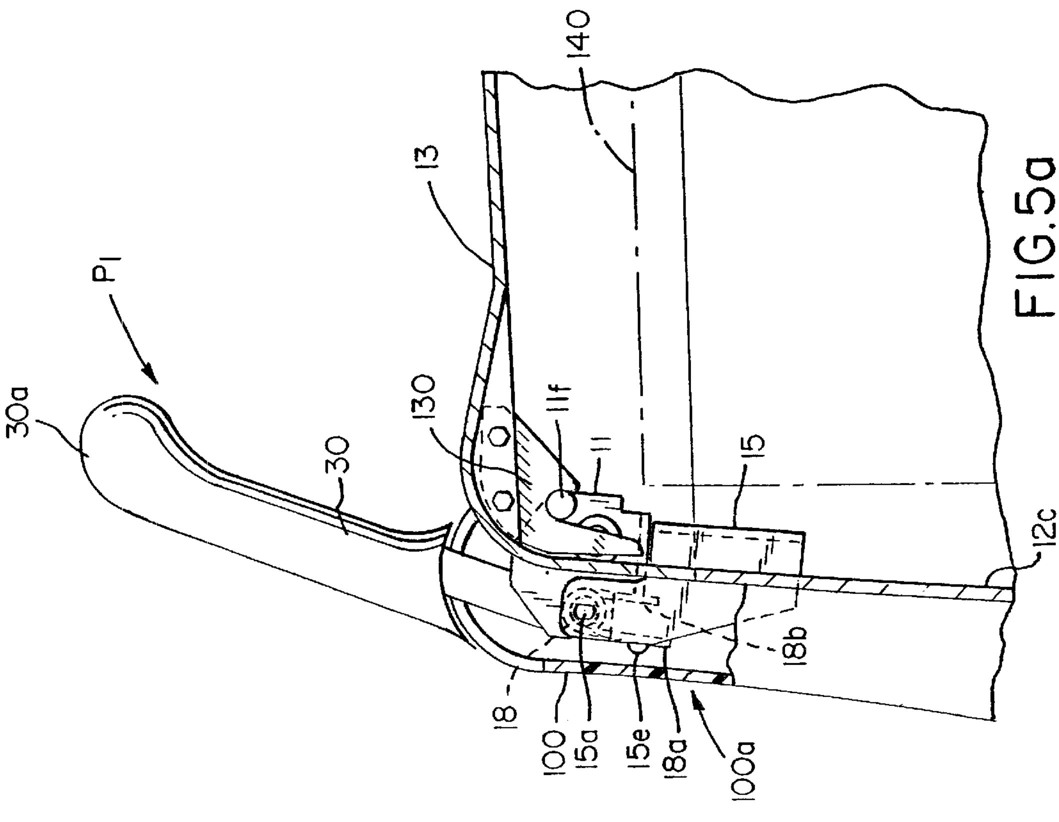
FIG. 5*a* is a partially cross-sectional, partially cutaway side view showing the second bracket in a first position and taken along view line 5*a*—5*a* in FIG. 4.

The hook 130 engages a cantilevered pin 11*f* projecting outwardly from the second bracket 11 when the seat deck 13 is in its "down" position so as to maintain the bias spring 18 and second bracket 11 in a first position $P_1$ relative to the first bracket 15, see FIG. 5*a.* When the second bracket 11 is in its first position, generally planar plate portion 11*g* of the bracket 11 is located in a substantially horizontal plane, and the legs 18*a,* 18*b* of the spring 18, which both project downwardly in this preferred embodiment, are moved closer to each other. The seat deck 13 is shown in its "down" position in FIGS. 1, 2, 4 and 5*a* (note dashed line outline of spring 18).

When the latch 13*a* on the seat deck 13 is manually released (see action arrow C in FIG. 4) and the seat deck 13 is pivoted upward (see action arrow A in FIG. 5*b*), the hook 130 disengages pin 11*f.* An operator may easily release the latch 13*a* when positioned on either side of the truck. Upon removing the substantially downward force of seat deck 13 on pin 11*f,* the spring expands such that leg 18*b* moves away from leg 18*a*. This causes the bracket 11 to rotate (counterclockwise, or in the direction of action arrow B as viewed in FIG. 5*b*) about pins 15*a* and 15*d* on the bracket 15 to a second position $P_2$. When the bracket 11 moves to its second position, the plate portion 11*g* rotates through an angle of about 22° from its substantially horizontal first position (compare FIGS. 5*a* and 5*b*). Despite this reference to a most preferred degree of angular rotation, it is also contemplated that the plate portion 11*g* could rotate through other angles which fall within the range of from about 15° to about 90° from the first position.

As should be appreciated from viewing FIG. 5*b,* the control handles 30–33 and bellcranks 22 and 27–29 rotate with the bracket 11 and, hence, move away from the seat deck 13. The links 19, however, do not move relative to the bracket 15 during rotation of the bracket 11 as the bellcranks 22 and 27–29 pivot about their retainer pins 23*a* without displacing the links 19. It is noted that retainer pins 23*a* are substantially coaxial with pins 15*a* and 15*d.* The seat deck 13 may then continue to freely pivoted upwardly, such as to permit the operator to access the battery 140 or other component without contacting or otherwise interfering with the control handles 30–33. Then, when the seat deck 13 moves towards a closed position (i.e., rotates downwardly), and after it has moved past upper ends 30*a*–33*a* of the handles 30–33, the hook on the seat deck 13 reengages the pin 11*f.* This engagement causes the bracket 11 to rotate against the bias of the spring 18 to its first position $P_1$. The locking of the latch 13*a* maintains the bracket 11 in its first position $P_1$.

With reference back to FIG. 3*a,* a stop 112 is preferably provided in this most preferred embodiment to limit the rotational movement effected by the spring 18 of the second bracket 11 relative to first bracket 15. This stop 112 comprises, for example, a bolt 112*a* threadedly received in a tapped opening 11*h* in the bracket 11. Rotational movement of the second bracket 11 relative to the first bracket 15 stops when the head of the bolt 112*a* engages the rear wall of first bracket 15. A nut 112*b* is also provided to lock the bolt 112*a* in position relative to the bracket 11, as well as to allow for height adjustments.

As shown in FIGS. 1, 2, 4, 5*a*, and 5*b*, a removable cover 100 is provided over bellcranks 22 and 27–29, links 19, cams 60, switches 80*a*–80*d* and valves 72*a*–72*d*, but includes slots (not numbered) that allow the lower end portion of the control handles 30–33 to pass and engage the corresponding bellcranks 22, 27–29. This cover 100 is fixedly coupled to the base portion 12*c* of the body 12 and, thus, remains stationary during movement of the bracket 11 between its first and second positions $P_1$, $P_2$. Due to the compact nature of the brackets 11 and 15 and the mounting of the switches 80*a*–80*d* directly to the valves 72*a*–72*d*, the cover 100 has a narrow profile and includes a generally planar outer face 100*a*. Advantageously, this prevents the cover 100 from interfering with the operator's ingress into and egress from the compartment 14.

Figure 6:
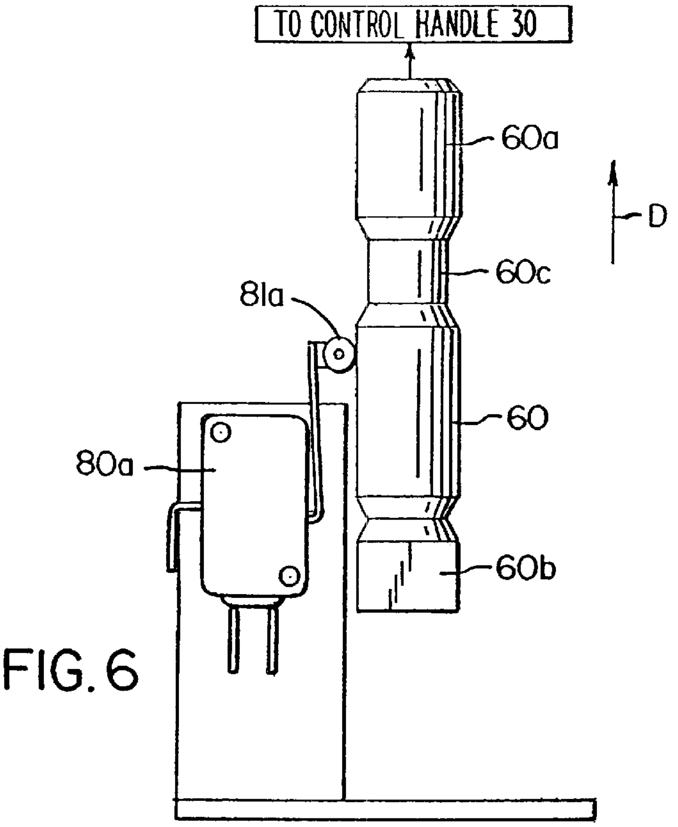
FIGS. 6–9 are schematic views, each showing the cam associated with each control handle assembly for actuating a switch that controls the flow of fluid through a corresponding valve.

In operating the control valve linkage assembly 20 generally, the first control handle 30 is rotated toward the operator causing the spool 70 of the valve 72*a* and its associated cam 60 to be raised. Upward movement of the spool 70 past its centered position opens the valve 72*a* such that hydraulic fluid is permitted to travel to the hydraulic cylinders (not shown) of the mast assembly 50. The corresponding upward movement of the cam 60 (see action arrow D in FIG. 6) causes a roller arm 81*a* of the switch 80*a* to move out of a first groove 60*c* in the cam 60, which results in the actuation of the first switch 80*a*. Actuation of the switch 80*a* causes a hydraulic pump apparatus (not shown) to supply hydraulic fluid under pressure through the valve 72*a* to the mast assembly 50. Movement of the control handle 30 away from the operator and to the home or centered position results in the roller arm 81*a* moving back into the groove 60*c* such that the switch 80*a* is no longer actuated. Further movement of the control handle 30 away from the operator results in the valve 72*a* opening to allow hydraulic fluid to drain from the hydraulic cylinders of the mast assembly 50 to a hydraulic reservoir (not shown). As should be appreciated, movement of the control handle 30 away from the operator and beyond its centered position does not result in the switch 80*a* being actuated. Hence, the hydraulic pump apparatus is not actuated when the control handle 30 is moved away from the operator beyond its centered position.

Figure 7:
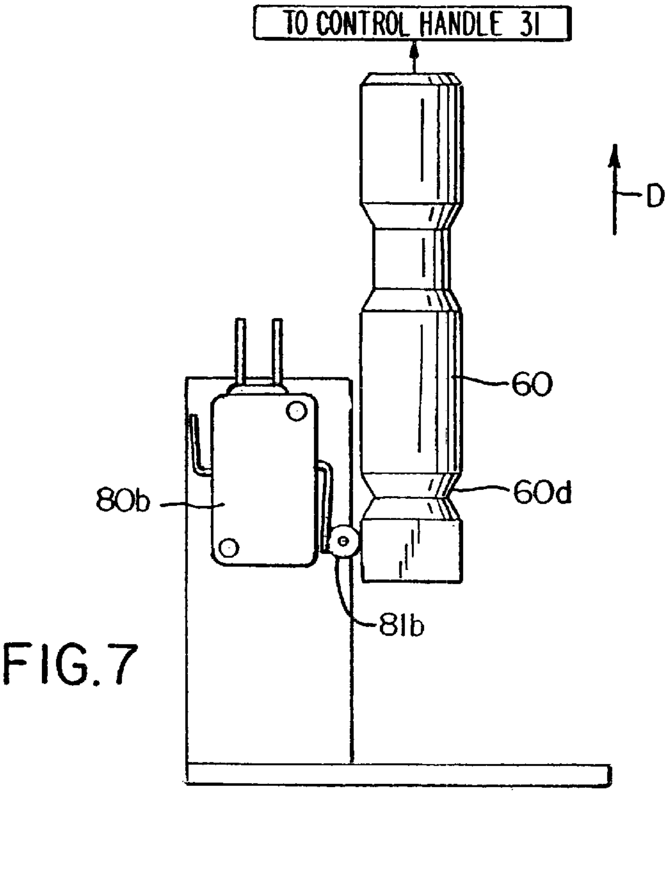

To tilt the mast assembly 50 and the forks 40, the second control to handle 31 is rotated toward or away from the operator causing the spool 70 of the valve 72*b* and its associated cam 60 to be raised or lowered. Movement of the spool 70 past its centered position opens the valve 72*b* such that hydraulic fluid is permitted to travel between the hydraulic cylinders (not shown) coupled to the body 12 and the mast assembly 50 and a hydraulic pump apparatus (not shown) and a hydraulic reservoir (not shown) for effecting tilting movement of the mast members 52, 54 and 56 toward and away from the operator. Movement of the cam 60 from its centered position causes a roller arm 81*b* of the switch 80*b* to move out of a second groove 60*d* in the cam 60 resulting in actuation of the second switch 80*b* (see FIG. 7). Actuation of the switch 80*b* results in the hydraulic pump apparatus supplying hydraulic fluid under pressure through the valve 72*b* to the hydraulic cylinders (not shown) coupled to the body 12 and the mast assembly 50.

Figure 8:
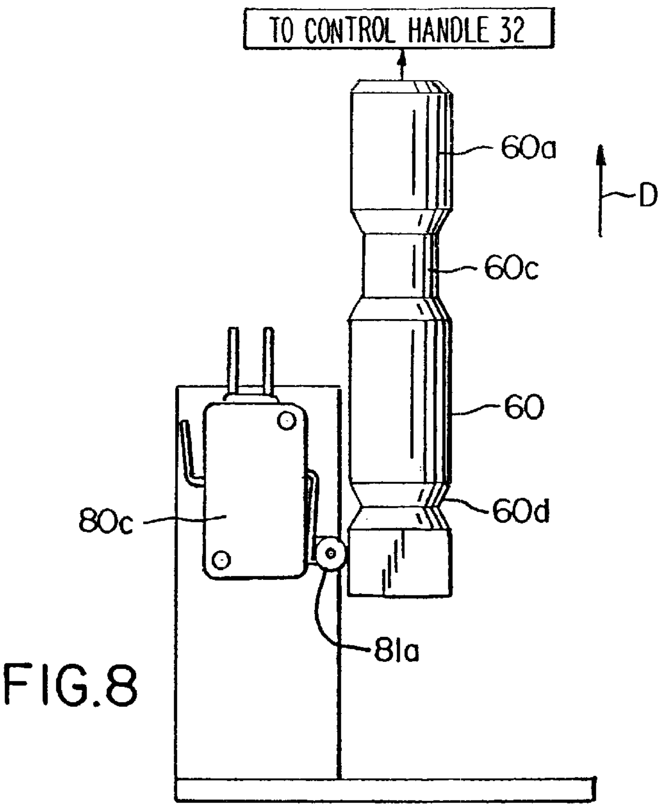

To move the carriage mechanism 42 and the forks 40 from side to side about the vertical axis $A_1$, the third control handle 32 is rotated toward or away from the operator causing the spool 70 of the valve 72*c* and its associated cam 60 to be raised or lowered. Movement of the spool 70 past its centered position opens the valve 72*c* such that hydraulic fluid is permitted to travel between appropriate hydraulic cylinders (not shown) provided between the mast assembly 50 and the carriage mechanism 42 and a hydraulic pump apparatus (not shown) and a hydraulic reservoir (not shown) to effect side to side movement of the carriage mechanism 42 and the forks 40. Movement of the cam 60 from its centered position causes a roller arm 81*a* of the switch 80*c* to move out of a second groove 60*d* in the cam 60 resulting in actuation of the third switch 80*c* (see FIG. 8). Actuation of the switch 80*c* results in the hydraulic pump apparatus supplying hydraulic fluid under pressure through the valve 72*c* to hydraulic cylinders provided between the mast assembly 50 and the carriage mechanism 42.

Figure 9:
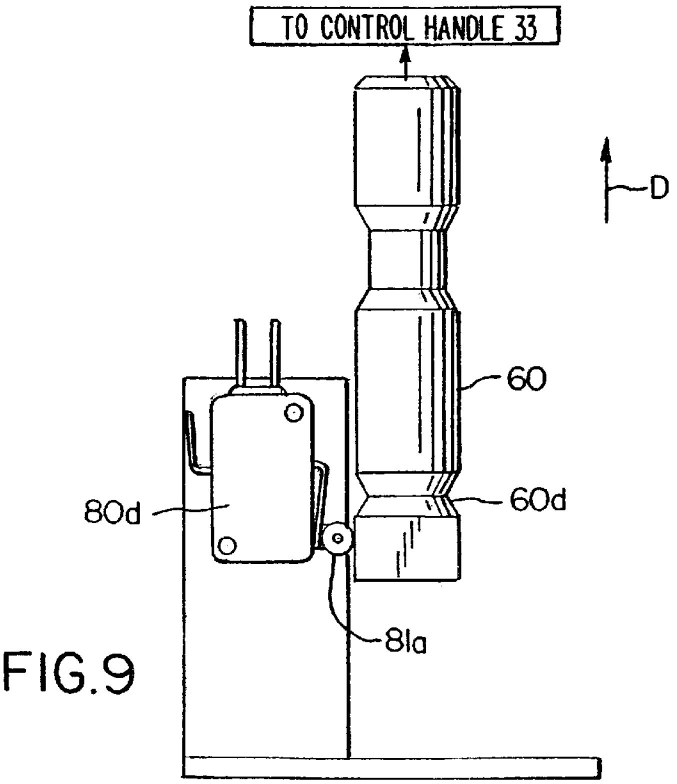

To rotate the carriage mechanism 42 and the forks 40 about an axis of rotation $A_2$, the fourth control handle 33 is rotated toward or away from the operator causing the spool 70 of the valve 72*d* and its associated cam 60 to be raised or lowered. Movement of the spool 70 past its centered position opens the valve 72*d* such that hydraulic fluid is permitted to travel between appropriate hydraulic cylinders (not shown) provided between the mast assembly 50 and the carriage mechanism 42 and a hydraulic pump apparatus (not shown) and a hydraulic reservoir (not shown) to effect rotational movement of the carriage mechanism 42 and the forks 40. Movement of the cam 60 from its centered position causes a roller arm 81*a* of the switch 80*d* to move out of a second groove 60*d* in the cam 60 resulting in actuation of the fourth switch 80*d* (see FIG. 9). Actuation of the switch 80*d* results in the hydraulic pump apparatus supplying hydraulic fluid under pressure through the valve 72*d* to hydraulic cylinders provided between the mast assembly 50 and the carriage mechanism 42.

It is further contemplated that the control valve linkage assembly may include only first, second and third control handles (not shown), such as for controlling fork height, side shift, and tilt. Moreover, it is also possible to provide only two control handles (not shown), such as for controlling fork height and tilt. It is additionally contemplated that control handles 32 and 33 may be employed to control options other than fork side shift and fork rotation. For example, the handles 32 and 33 may be used to control the following functions: fork spread (forks traverse left and right symmetrically about the center of the truck); load stabilizer (a pad comes down on the load to keep it from tipping/shifting); push/pull (a device extends out, clamps on a bottom sheet (e.g., cardboard or plastic) and pulls the sheet onto the forks/pushes to remove); clamp (device that clamps the load from the sides); rotate (device that clamps and rotates (e.g., barrels, rolls of paper, etc.) left and right); and upender (device that provides the ability to rotate a load forward and backward (e.g., used for pouring)), or any like function where control of a mechanism associated with a lift truck or other vehicle is provided through the actuation of switches or the like.

The foregoing description of preferred embodiments of the present invention have been presented for purposes of illustration and description. It is not intended to be exhaustive or to limit the invention to the precise form disclosed. Obvious modifications or variations are possible in light of the above teachings. The embodiments were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A control handle support and valve linkage apparatus for mounting adjacent a movable deck on a lift truck, comprising:

a first stationary bracket;

a second bracket in engagement with said first bracket;

a spring for biasing said second bracket relative to said first bracket;

at least one control handle assembly coupled to said second bracket;

structure for coupling said at least one control handle assembly to at least one control valve;

wherein said second bracket is movable relative to said first bracket between a first position and a second position, said second bracket being in said first position when a portion thereof is engaged as a result of said deck being in a closed position and said second bracket being in said second position when said deck is moved to an open position and a substantial force is no longer being applied against said second bracket portion, and said coupling structure does not substantially change its position so as to substantially influence the position of said at least one valve when said second bracket moves between its first and second positions.

2. An apparatus as set forth in claim 1, wherein said spring biases said second bracket toward said second position and effects movement of said second bracket to said second position when said deck is moved to the open position.

3. An apparatus as set forth in claim 1, wherein said second bracket rotates through an angle from about 15 degrees to about 90 degrees in moving from the first position to the second position.

4. An apparatus as set forth in claim 1, wherein said second bracket portion comprises a projecting member and said deck further comprises an actuator for engaging said projecting member to pivot said second bracket to said first position when said deck is in a closed position.

5. An apparatus as set forth in claim 4, wherein said projecting member is a substantially cylindrical rod and said actuator includes a C-shaped recess for engaging said rod.

6. An apparatus as set forth in claim 1, wherein the deck is at least a portion of a seat deck forming a part of a base portion of the lift truck.

7. An apparatus as set forth in claim 1, wherein said coupling structure comprises at least one link and at least one cam, said at least one link being coupled to said at least one control handle assembly and said at least one cam, and said at least one cam being further coupled to said at least one valve.

8. A control handle support and valve linkage assembly as set forth in claim 1, wherein the deck is a seat deck forming a part of a base portion of the lift truck.

9. A control handle support and valve linkage assembly mounted adjacent to a movable deck on a lift tuck including a carrying assembly, comprising:

a first stationary bracket;

at least one valve for controlling the flow of a fluid to and away from the carrying assembly on the lift truck;

a second bracket engaging said first bracket;

a spring for biasing said second bracket relative to said first bracket;

at least one control handle assembly coupled to said second bracket;

structure for coupling said at least one control handle assembly to said at least one valve; and wherein said second bracket is movable relative to said first bracket between a first position and a second position, said second bracket being in said first position when a portion thereof is engaged as a result of said deck being in a closed position and said second bracket being in said second position when said deck is moved to an open position and a substantial force is no longer being applied against said second bracket portion, and said coupling structure does not substantially change its position so as to substantially influence the position of said at least one valve when said second bracket moves between its first and second positions.

10. A control handle support and valve linkage assembly as set forth in claim 8, further comprising a stationary cover.

11. A control handle support and valve linkage assembly as set forth in claim 10, wherein said stationary cover has a generally planar outer surface and said lift truck has an operator's compartment, whereby said planar outer surface does not interfere with ingress to and egress from said operator's compartment.

12. A control handle support and valve linkage assembly as set forth in claim 9, wherein said second bracket rotates through an angle of from about 15 degrees to about 90 degrees in moving from the first position to the second position.

13. A control handle support and valve linkage assembly as set forth in claim 9, wherein said coupling structure comprises at least one link and at least one cam, said at least one link being coupled to said at least one control handle assembly and said at least one cam, and said at least one cam being further coupled to said at least one valve.

14. A control handle support and valve linkage assembly as set forth in claim 9, further comprising at least one switch coupled directly to said at least one valve and being operable to control fluid flow to said at least one valve.

15. A control handle support and valve linkage assembly as set forth in claim 9, wherein said at least one valve comprises at least one spool valve.

16. A control handle support and valve linkage assembly as set forth in claim 9, wherein said at least one control handle assembly comprises first and second control handle assemblies.

17. A control handle support and valve linkage assembly as set forth in claim 16, wherein each said control handle assembly comprises a control handle and a bellcrank, said control handle being fixedly coupled to said bellcrank.

18. A control handle support and valve linkage assembly as set forth in claim 9, wherein said spring biases said second bracket toward said second position and effects movement of said second bracket to said second position when said deck is moved to the open position.

19. A control handle support and valve linkage assembly as set forth in claim 9, wherein said second bracket portion comprises a projecting member and said deck further comprises an actuator for engaging said projecting member to cause said second bracket to move to said first position when said deck is moved to its closed position.

20. A control handle support and valve linkage assembly set forth in claim 19, wherein said projecting member is a substantially cylindrical rod and said actuator includes a C-shaped recess for engaging said rod.

21. A lift truck comprising:

a movable deck; and a control handle support and valve linkage apparatus mounted adjacent to said movable deck and comprising a first stationary bracket; a second bracket in engagement with said first bracket at least one control handle assembly coupled to said second bracket; structure for coupling said at least one control handle assembly to at least one control valve; wherein said second bracket is movable relative to said first bracket between a first position and a second position, said movable deck engaging a portion of said second bracket during movement of said deck to a closed position so as to effect movement of said second bracket to a first position, said second bracket being moved to said second position when said deck is moved to an open position and a substantial force is no longer being applied against said second bracket portion, and said coupling structure does not substantially change its position so as to substantially influence the position of said at least one valve when said second bracket moves between its first and second positions.

22. A lift truck as set forth in claim 21, wherein said second bracket further comprises a projecting member and said deck further comprises an actuator for engaging said projecting member to cause said second bracket to move to said first position when said deck is moved to its closed position.

23. A lift truck as set forth in claim 21, wherein said deck is at least a portion of a seat deck forming a part of a base portion of the truck.

* * * * *

UNITED STATES PATENT AND TRADEMARK OFFICE

CERTIFICATE OF CORRECTION

PATENT NO. : 6,557,586 B1
DATED : May 6, 2003
INVENTOR(S) : Lockyer et al.

It is certified that error appears in the above-identified patent and that said Letters Patent is hereby corrected as shown below:

Column 6,
Line 51, "to freely pivoted upwardly" should read -- to freely pivot upwardly --;

Column 7,
Line 49, "second control to handle" should read -- second control handle --.

Column 11,
Line 6, "bracket at least one" should read -- bracket; at least one --.

Signed and Sealed this

Twenty-fourth Day of February, 2004

JON W. DUDAS
*Acting Director of the United States Patent and Trademark Office*